United States Patent Office 2,729,780
Patented Jan. 3, 1956

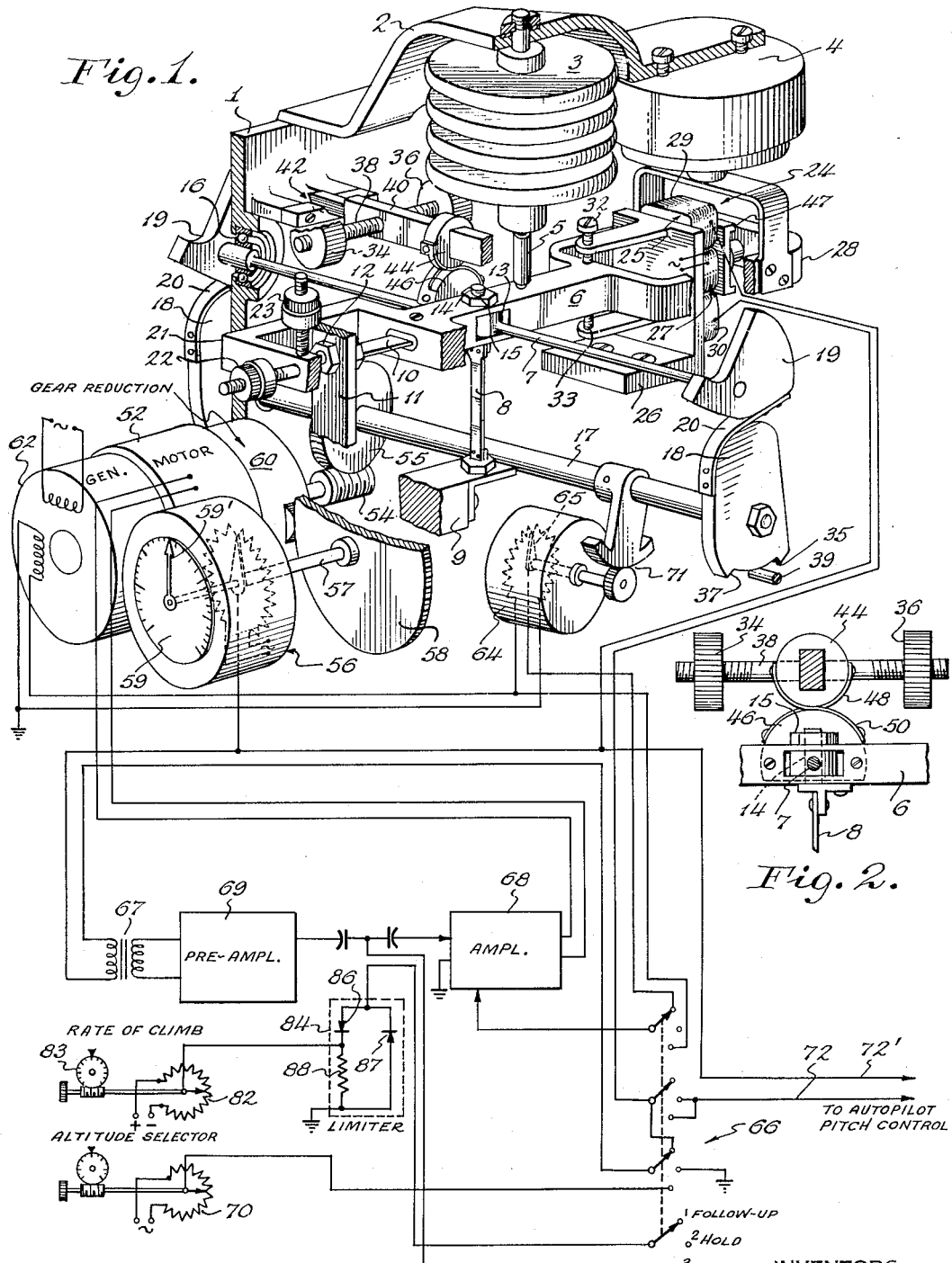

2,729,780

ALTITUDE CONTROL FOR AUTOMATIC PILOTS

Harry Miller, Brooklyn, and Robert D. Love, Malverne, N. Y., assignors to Sperry Rand Corporation, a corporation of Delaware Application February 9, 1951, Serial No. 210,152

18 Claims. (Cl. 318—489)

This invention relates to sensitive pressure responsive instruments designed for controlling the altitude or airspeed of an airplane. If used for the former purpose, the aneroid barometric unit is evacuated and sealed so that it expands or tends to expand with increasing altitude, while if used as an airspeed responsive device, the exterior or one part of the unit is usually connected to static pressure and the interior or other part of the unit to a Pitot tube or other airspeed responsive device. Many features of our invention apply to both types of instruments, but in the description which follows the invention is shown as applied as an automatic altitude control of an automatic pilot for aircraft. It is necessary that instruments of this character be of great precision and unresponsive to all acceleration forces, that sticking be avoided and that the behavior of the instrument be compensated for high altitudes as well as sea level, all of which we have achieved by our invention.

By our invention, we have also improved the methods of controlling the automatic pilot from an instrument of this character and we have provided a means to prevent the automatic pilot from ever throwing the craft into a dangerous climb or dive angle. To this end, we have provided a means whereby the output of the altimeter is always maintained at zero when the altimeter is not connected to the controls of the aircraft, so that regardless of what value the altitude selector may be set at when the pilot is thrown in, no sudden movement of the elevator will result, the change of altitude being effected only within safe limits, to limit the rate of climb or descent to a safe value.

By our invention, we have further improved the electrical controls from the altimeter so that great accuracy is secured and hunting prevented. As is well known, the average aneroid barometer will not vary appreciably for a change of altitude of a few feet and if it does change, it usually changes in slight jumps or jerks. Due to this cause barometric controls of aircraft up to the present time have not been entirely successful and it is one of the objects of this invention to improve such controls so that smooth level flight may be obtained at the desired altitude without unpleasant undulations in flight.

Referring to the drawings showing a preferred form of our invention,

Fig. 1 is a combined perspective view and elementary wiring diagram of a sensitive altimeter constructed according to our invention and how it is used to control the pitch attitude of an aircraft; and Fig. 2 is a detail partly in section of the balancing masses and their mounting, used for counter-balancing the effects of torsional vibrations of the sensitive element.

In Fig. 1 the main casing 1 with its top 2 are shown broken away to show the interior of the instrument. To the top of the instrument is secured the aneroid barometric unit 3 and a damper 4 which is preferably of a known magnetic or eddy current type. The movable wall of the barometer is connected through a coupling link 5 to a balancing beam or bar 6, the barometer normally exerting an upward pull on the arm through the link 5, the pull decreasing as a function of increasing altitude. Said arm is pivotally mounted by being clamped to the middle of a torsional cross rod 7, the outer ends of which are journaled in the casing 1 by bearings 16. The middle of the torsion rod 7 is shown as extending through a cross-slot 13 in the bar 6 and is anchored thereto by threaded rod 14 and clamping nut 15. An additional guide for the center of the rod is provided by leaf springs 8 and 10. The primary leaf spring 8 is shown as anchored at its bottom to a framework 9 within the casing and at the top to the bar 6. It is placed with its bending axis parallel to or in line with the axis of rod 7 and as the barometer is normally pulling upwardly on bar 6, leaf spring 8 is normally under tension, but will permit the rotation of bar 6 about the axis of torsion rod 7. The secondary leaf spring 10 is adjustably clamped between the fixed support 11 and an end of the bar 6. The two leaf springs together furnish an orthogonal resilient and frictionless pivotal support for the arm 6 and the center of arm 7. The spring 10 may be adjusted by means of nuts 12 to adjust the position of the arm 6 to and fro to accurately adjust the air gap of the inductive pick-off 24 at the far end of the bar.

Means are also shown for energizing the rod 7 by applying a variable counter torque thereto which is transmitted to the arm 6 to balance the pull exerted by the aneroid barometer on the arm 6. For this purpose the torsion rod 7 is coupled to a cross shaft 17 preferably through linearizing gears or cam members 18 and 19, which are preferably duplicated at each end of the rods. These members may be irregularly shaped gears, but are preferably cam-like discs connected by a strap 20, the lower end of which is shown fastened to the cam 18 and the upper end to cam 19. These cams are shaped to compensate for the fact that the rate of change of force exerted by the aneroid barometer per unit of altitude variation is not linear but decreases with altitude and therefore at low altitudes, to rotate the shaft 7, through unit angle requires a smaller angular movement of the shaft 17 than at higher altitudes, but by means of the cams the rate of turn of shaft 17 is kept constant for a constant rate of change of altitude, regardless of the altitude. Limiting stops 35, 37 are provided on member 18 which strike stop pin 39 to prevent rotation beyond a desired limit.

The moving or sensitive member of the aforesaid transformer 24 which may be a soft iron armature 47, is secured to an open extension 28 on arm 6 while the stationary or three-fingered, wound element thereof 25 is secured to a fixed bracket 26. Element 25 carries the usual central primary winding 27 and outer opposed pick-off coils 29, 30. Adjustable stops 32, 33 are shown to limit the movements of arm 6 on shaft 7.

The bar 6 is preferably both statically and dynamically balanced about the axis of rod 7 and the vertical axis through the center of rod 7. For this purpose, it is shown as provided with a rectangular extension 21 at its rear to which adjustable balancing weights 22 and 23 are secured.

The arm 6 is also compensated for torsional oscillations and vibrations of the airplane. To this end, we provide two pairs of adjustable masses 34, 36 each on a threaded shaft 38 secured in a balancing bar 40 which is pivoted on an axis above shaft 7 on pivots 42 shown as in the form of knife edge pivots. In Fig. 1, bar 40 is broken away forward of its middle, but it will be understood that all parts connected thereto in the rear of the middle as shown in the figure are duplicated at the forward end of the bar including knife-edge pivots, masses 34, 36 and the reversible gears or discs 44, 46 which connect the rod 7 and the bar 40, as will now be described.

The discs 44, 46 are preferably reversibly connected by means of flexible straps 48, 50 similar to straps 20 previously described, but in this case, two straps are used on each pair of discs, since motion is to be transmitted positively in both directions. The angular momentum ($K^2W$) of the masses 34, 36 when multiplied by the mechanical advantage of the comparative radii of the two discs, is chosen so as to be equal to the angular momentum ($K^2W$) of the bar 6 and its attached elements and since they are oppositely connected, no disturbing force will reach the bar due to angular accelerations.

The shaft 17, above described, is rotated from a servo-motor 52 through irreversible worm 54 and worm gear 55. Between the motor 52 and the worm 54 there is provided a very large gear reduction in box 60, so that upwards of a million turns of the motor are required to rotate the worm gear through a single turn. When the barometric control is not being used to control the altitude automatically, the motor is driven from the output of the E pick-off 24, so that the output of the E pick-off is kept at zero. This same motor is preferably also brought into action to cause climbing or diving of the aircraft at predetermined safe rates by altering the counter force exerted on the aneroid, as hereinafter described.

In our device, the position of the movable wall of the barometer does not change appreciably with altitude changes, but, on the other hand, our system measures or responds to altitude changes by varying the counter pressure exerted on the barometer through motor 52 and the torsion rod 7, so that the system is always balanced with arm 6 in the same position. Therefore, the extent of rotation of shaft 17 and the motor 52 in keeping the system balanced is a measure of the atmospheric pressure at the airplane and the torsion rod 7 is made flexible enough so that a substantial angular movement occurs between the sea level position and the maximum altitude, an angle of upwards of 45° being found convenient to use for obtaining good sensitivity. We provide, therefore, an altitude reference signalling device 56 (hereinafter referred to) which is actuated in accordance with the rotation of the shaft 17 and which may also be provided with an altitude indicating dial 59 either at the device or remotely actuated therefrom.

As a means for preventing hunting of motor 52 and assuring accurate positioning of the shaft 7, we provide a speed feed-back generator 62 which preferably produces an A. C. output of the same frequency as the supply, but of a magnitude proportional to the speed of the generator and a phase which reverses with change in direction of rotation of the motor, such generators being well known in the art as shown in the patent to A. S. Riggs, No. 2,115,086 for Nonhunting Remote Control System, dated April 26, 1938. The output of this generator is compensated during follow-up operations by means of an altitude linearizing potentiometer 64 which is geared to the shaft 17 and designed so that the output of generator 62 is compensated for the fact that as the altitude increases the feed back voltage shold be decreased as otherwise overdamping would take place at high altitudes.

The altitude reference potentiometer 56 above referred to is shown as coupled to gear train 60 through gear 58 on shaft 57 of said potentiometer. By designing this potentiometer so that its shaft 57 makes a predetermined number of revolutions, such as one revolution, for a complete range of altitude of the instrument, the position of said shaft and its potentiometer, gives a direct indication of altitude and therefore a pointer 59' may be attached to the shaft readable on altitude dial 59. The output of the potentiometer is, of course, directly proportional to altitude and may be used if desired to actuate a remote altitude indicator.

Referring now to the elementary wiring or flow diagram portion of Fig. 1, a three-position multi-element switch unit 66 is shown whereby our altimeter may be either (1) shut off from the control of the auto-pilot on the craft, (2) used to hold any predetermined altitude desired through the automatic pilot, or (3) cause the craft to climb from some altitude to another predetermined altitude at a desired rate. In the upper or full line position (1), the ganged switches 66 are shown as disconnecting the altimeter from the automatic pilot. In this position, the output from the E pick-off 24 of the altimeter is fed through a coupling transformer 67 and pre-amplifier 69 into an amplifier 68 and thence to said servo or torque motor 52 which, therefore, by rotating shafts 17 and 7, keeps the output of the pick-off at zero so that if at any time the switch is moved to the second or hold position or to the third position, the craft will continue to fly for the time being at the altitude that it was in at the time of transfer. It will be noted that in this position, the altitude reference potentiometer is electrically ineffective, but the anti-hunt or speed generator 62 is effective together with the linearizing potentiometer 64 so as to assure deadbeat alignment of the members of the E pick-off at all times. To this end, the voltage generated by the generator 62 is led through the linearizing potentiometer 64, which is tapped by slider 65 turned from the shaft 17 through gearing 71, the slider being electrically connected in position 1 of switch 66 to the amplifier 68, where this signal normally opposes the primary signal entering the amplifier from the output of the pre-amplifier 69 to drive the motor 52.

In the second or hold position of the switch 66 the output of the E pick-off 24 is fed to the pitch or elevator control of the automatic pilot (as indicated) through leads 72, 72'. It is noted that in this position the circuit to follow-up motor 52 from the E pick-off and to both potentiometers 56 and 64 is ineffective, so that the output of the E pick-off will operate the elevator controls through the automatic pilot to keep the craft at such preset altitude in conjunction with the attitude gyro controls of the automatic pilot. This may be done as suggested in Fig. 2 of the patent to F. L. Moseley for Radio Controlled Pilot System, No. 2,496,809, dated February 7, 1950, in which the signal from applicant's altimeter is used in place of Moseley's glide path signal or as suggested in the patent to J. C. Newton, No. 2,429,642, dated October 28, 1947, for Craft Control Apparatus, where the altimeter signal is matched with the gyro-vertical signal of the gyro-pilot before being fed into the elevator servo-motor channel.

The lower or third position is used when it is desired to cause the craft to change its altitude, i. e., either climb or descend. In this position, auxiliary controls are brought into play, namely, the altitude reference potentiometer 56, an altitude selector potentiometer 70 and preferably also a rate of climb (or descent) potentiometer 82. It will be understood that while we have shown only potentiometers as signal generators in most locations, other types of such generators may be used if desired, such as a selsyn transformers, E pick-offs, etc.

In position three, the effective voltage supplied to coupling transformer 67 is governed by the relative positions of the wiper arms of potentiometers 70 and 56, which voltage represents the error voltage between the desired altitude and the present altitude of the craft. This signal, after being amplified in the pre-amplifier 69, is further modified in position three, however, before it is fed into the final amplifier 68 for the purpose of limiting the rate of climb or descent of the craft to a safe and desired rate. A voltage limiter 84 is shown for this purpose, as by passing to ground a portion of the signal voltage.

In position one, it should be noted the limiter is open circuited, so that the full voltage generated by the E pick-off is fed into amplifier 68. In position three, however, it is necessary to limit the error voltage between potentiometers 56 and 70 so that the rate of climb or descent will be limited to a safe and desired value. Said limiter 84 limits the signal voltage fed to motor 52 to limit its speed and thereby the rate of climb or dive and also acts to permit various unsafe rates of climb by the settable rate of climb potentiometer 82, the dial 83 of which may be graduated in feet per minute. The limiter 84 consists essentially of a pair of rectifiers 86, 87 oppositely connected across parallel by-passes to ground. In the positive side of the by-pass, there is placed a resistor 88 and between the resistor and rectifier 86, a D. C. voltage variable with the position of the potentiometer 82 is connected. Since the voltage entering the limiter from the pre-amplifier is alternating, the effect of the limiter will be to short out the negative halves of the waves and to also short out a portion of the positive waves at a cutoff point determined by the amount of positive voltage applied between resistor 88 and rectifier 86. The effect, therefore, is to by-pass a portion of the signal from the pre-amplifier which is variable in accordance with the setting of the potentiometer 82. The rate at which the motor 52 is driven, therefore, is limited to produce the rate of climb desired by this means, but in no event is a rate permitted greater than a safe rate. It should also be observed that in position three, the anti-hunt generator 62 is also in circuit to assure smooth climb or dive, but in this case the linearizing potentiometer need not be used.

According to our invention, the rate of climb or descent is automatically reduced as the aircraft approaches the preset altitude to level the craft off smoothly, since, as the preset altitude is approached, the error signal between the altitude selector 70 and the altitude reference potentiometer 56 will gradually approach zero, thus reducing the voltage supplied to the pre-amplifier until it equals the lower limit of the limiter, at which time the limiter becomes ineffective.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pressure responsive device comprising a pivoted control bar, leaf springs providing a pivotal orthogonal axis mounting therefor, said bar being statically balanced about its pivotal axis, means for preventing vibratory oscillations from affecting said bar including a second weighted bar, means for pivotally mounting the same about an axis parallel to the axis of said first bar, and means for oppositely coupling said two bars so that ratio of the moment of inertia of the two bars to their respective lever arms are equal and opposite.

2. In a pressure responsive device of the type wherein a pivoted control member is subjected to two opposing couples derived respectively from a barometric element and an energized resilient member, the combination comprising motive means connected to said resilient member for energizing the same, a pick-off for providing a control signal in accordance with pivotal movements of said control member about a null position occurring when said opposing couples are equal, reference means driven by said motive means to a setting corresponding to a reference altitude, selector means manually positioned to a setting corresponding to a desired altitude, means connecting said reference means and selector means for providing a signal output dependent on the difference between said settings, and means for applying said difference signal output in controlling relation to said motive means whereby said control member is offset from its null position to produce an altitude control signal so long as disagreement exists between the reference altitude and the desired altitude.

3. An altitude control for an aircraft automatic pilot operable to control a craft about its pitch axis, said control comprising an aneroid having a movable wall responsive to atmospheric pressure, a pivoted member connected to said wall, said aneroid exerting a couple dependent on craft altitude on said member tending to rotate the same about its pivotal axis, a flexible rotatable shaft connected to said member and extending along said axis, signal generating means responsive to angular movements of said member, means normally controlled by the signal output of said signal generating means for imparting a twist to said shaft sufficient to balance the couple exerted thereon by said aneroid, and means including a switch for removing the signal generating means from controlling relation to the twist imparting means and placing said signal generating means in controlling relation to the pitch control of said automatic pilot whereby the aircraft is controlled to maintain the altitude at which said switch is operated.

4. An altitude control for an aircraft automatic pilot, as claimed in claim 3, also having means for changing altitude, said means comprising a manually settable altitude selector, an altitude reference device connected to be driven from said twist-imparting means, means for providing a signal dependent on the difference between the settings of said altitude selector and said altitude reference device, and means for applying said difference signal in controlling relation to said twist-imparting means whereby the craft may be controlled to seek the altitude set on said altitude selector.

5. An altitude control for an aircraft automatic pilot, as claimed in claim 4, also having means for limiting the magnitude of said difference signal to limit the rate of climb or descent of the craft.

6. An altitude control for aircraft automatic pilots comprising a control member, a torsion member for rotatably supporting said control member, a barometric device connected to said control member at a point spaced from said torsion member for exerting a force thereon tending to rotate said control member against a counterforce exerted by said torsion member, a servomotor connected to a point on said torsion member spaced from said barometric device, a signal generating means adjacent an outer end of said control member for providing a control signal proportional to the difference between said forces, said control signal normally being applied to control said servomotor to balance the force exerted by said barometric means, and alternate means operable to supply said signal to the pitch control channel of the automatic pilot whereby the craft maintains the altitude at which said alternate means is operated.

7. An altitude control for an aircraft automatic pilot operable to control a craft about its pitch axis, said control comprising an aneroid element having a movable wall responsive to atmospheric pressure, a member connected to said wall, a flexible shaft for rotatably supporting said member, said aneroid element exerting a couple on said member tending to rotate the same, a pick-off responsive to angular movements of said member, irreversible transmission means, motive means normally energized in accordance with the output of said pick-off for imparting a twist to said shaft sufficient to balance the couple exerted by said aneroid element, said motive means being connected to said shaft through said irreversible transmission means for preventing said shaft from untwisting when said motor is deenergized, and means for switching the output of said pick-off from control of said motive means to control of said automatic pilot whereby the aircraft is controlled in pitch to maintain the altitude at which said switching means is operated.

8. In an altitude control device for an aircraft automatic pilot operable to control a craft about its pitch axis, said device being of the type wherein a pivoted control member is subjected to two opposing couples derived respectively from an aneroid element and an energized resilient member, the combination comprising motive means connected to said resilient member for energizing the same, said connection being made through irreversible transmission means, a pick-off for providing a control signal in accordance with pivotal movements of said control member about a null position obtained when said opposing couples are equal, means for applying said pick-off output in controlling relation to said motive means whereby the said two opposing couples may be balanced, and alternate means operable to apply said pick-off output in controlling relation to the pitch controls of said automatic pilot whereby the craft may be controlled to maintain the altitude at which said alternate means is operated while said irreversible means prevents deenergization of said resilient member through said motive means.

9. An altitude control device for an aircraft automatic pilot operable to control a craft about its pitch axis, said device comprising a bellows having one fixed end and the other end movable in accordance with changes in altitude, a control member connected to said movable end, a resilient member for rotatably supporting said control member at a point spaced from the connection thereof to said bellows, said resilient member exerting a couple on said control member opposing a couple exerted thereon by said bellows, pick-off means associated with said control member and having a null output when said two couples are balanced, motive means, irreversible transmission means connecting said motive means to drive said resilient member thereby to vary the opposing couple exerted by said resilient member on said control member, means for connecting said pick-off in controlling relation to said motive means for balancing said two couples over a predetermined range of altitude, and alternate means operable to connect said pick-off in controlling relation to the pitch controls of said automatic pilot whereby the craft may be caused to maintain the altitude at which said alternate means is operated.

10. Apparatus for controlling the attitude of a craft through its automatic pilot in accordance with an altitude responsive signal and permitting such control without such altitude signal comprising an altitude responsive device for supplying a voltage component varying in response to variations from the desired barometric pressure, means for normally applying such component to control the pitch governing part of said automatic pilot, a normally inoperative servomotor connected to said altitude device, means for producing a second voltage component proportional to the speed of said motor, means for varying said second component in accordance with a function of altitude, and means for disconnecting said first component from the control of the automatic pilot and simultaneously combining it with said second component as varied to actuate said servomotor during the period of disconnection.

11. An automatic altitude control for an aircraft automatic pilot comprising an aneroid bellows, a servomotor connected to said bellows, first means including a pick-off for providing a signal to control said motor to maintain said bellows in a predetermined or null position, second means operable to apply an alternate signal in controlling relation to said motor, said second means including a signal generator having one portion thereof continuously positioned by said motor and another portion thereof manually positioned in accordance with the desired altitude, said alternate signal being dependent on the difference in position of said portions, means for producing a signal varying with the speed of said motor, means for mixing said speed signal with said alternate signal whereby to render the speed of said motor proportional to the magnitude of said alternate signal, adjustable means for limiting the magnitude of said alternate signal, means to adjust said limiting means, and means for supplying said pick-off signal to the pitch controls of said automatic pilot upon operation of said second means.

12. An altitude control device for an aircraft automatic pilot operable to control a craft about its pitch axis, said device comprising an aneroid element having a movable wall responsive to atmospheric pressure, a control member connected to said wall, a flexible shaft for rotatably supporting said member, said aneroid element normally exerting a couple on said member tending to rotate the same, a pick-off responsive to rotational movement of said member, motive means normally energized in accordance with the output of said pick-off for imparting a twist to said shaft sufficient to balance the couple exerted by said aneroid element on said member, first means manually settable in accordance with an altitude to be attained, second means settable by said motive means in accordance with the amount of twist imparted to said shaft, the amount of such twist being a measure of present altitude, alternate means operable to energize said motive means in accordance with the difference in settings of said first and second settable means, and means for applying the pick-of output in controlling relation to the pitch controls of said automatic pilot when said alternate means is operated whereby the aircraft is controlled to fly to and maintain the altitude set by said first settable means.

13. In an altitude control device for an aircraft automatic pilot operable to control a craft about its pitch axis, said device being of the type wherein a pivoted control member is subjected to two opposing couples derived respectively from a barometric element and an energized resilient member, the combination comprising motive means connected to said resilient member for energizing the same, a pick-off for providing a control signal in accordance with pivotal movements of said control member about a null position obtained when said opposing couples are equal, reference means driven by said motive means to a setting corresponding to a reference altitude, selector means manually positioned to a setting corresponding to a desired altitude, means connecting said reference means and selector means for providing a signal dependent on the difference between said settings, and means for applying said difference signal in controlling relation to said motive means whereby the pick-off signal may be used in controlling relation to the pitch controls of said automatic pilot to cause the craft to fly to and maintain said desired altitude.

14. The altitude control device of claim 13 including means for generating a signal proportional to the speed of said motive means, and means for combining said speed signal with said difference signal to control said motive means.

15. The altitude control device of claim 14 including means for varying said speed signal in accordance with craft altitude.

16. An altitude control device for an aircraft automatic pilot operable to control a craft about its pitch axis, said device comprising a control member, a resilient member for rotatably supporting said control member and for exerting a couple thereon, an aneroid element connected to said control member so as to exert a couple thereon opposing the couple derived from said resilient member, motive means connected in driving relation to said resilient member whereby operation of said motive means varies the couple exerted by said resilient member on said control member, a pick-off responsive to rotation of said control member, said pick-off having a null output when said two opposing couples are equal in magnitude, signal generating means having an output dependent on the difference in positions of two portions thereof, one portion being positioned by said motive means in accordance with the couple imparted by said resilient member to said control member, the other portion being manually positioned in accordance with the magnitude of an aneroid-derived couple on said control member corresponding to a given altitude to be attained within a predetermined range of altitude, means for connecting said pick-off in controlling relation to said motive means for balancing said two couples over said predetermined range of altitude, and alternate means operable to connect said pick-off in controlling relation to the pitch control of said automatic pilot and concomitantly to connect said signal generating means in controlling relation to said motive means whereby said craft is caused to fly to and maintain said given altitude.

17. In a pressure responsive device of the force-balancing follow-up type wherein a pivoted control member is subjected to two opposing couples derived respectively from an aneroid element and an energized resilient member, said device being operable to control an aircraft in pitch through an automatic pilot, the combination comprising motive means, irreversible transmission means connecting said motive means to said resilient member for energizing the same, a pick-off responsive to rotation of said control member about its pivot, said pick-off having a null output when said two opposing couples are equal in magnitude, altitude reference means connected in driven relation to said motive means whereby said reference means is positioned in accordance with the magnitude of the couple imparted by said resilient member to said control member, altitude selector means adapted to be manually positioned in accordance with the magnitude of an aneroid-derived couple corresponding to the selected altitude, signal generating means having an output dependent on the difference between the respective positions of said reference and selector means, means for applying said pick-off output in controlling relation to said motive means whereby the said two opposing couples may be balanced, and alternate means for applying said pick-off output in controlling relation to the pitch controls of said automatic pilot and concomitantly applying the output of said signal generating means in controlling relation to said motive means, whereby said aircraft is caused to fly to and maintain said selected altitude.

18. A pressure responsive device comprising a pivoted control member, a torsion rod to which said member is secured and about which it is balanced on its pivotal axis, a signal generator producing a signal upon departure of said control member from a null, an aneroid device connected to said control member at a point spaced from said axis to exert a couple thereon, motive means actuated by said signal, a speed generator driven by said motive means and producing an anti-hunt feedback voltage tending to keep the motor speed proportional to said signal and prevent overshooting, means positioned by said motive means to reduce said feedback voltage as the pressure decreases, and means connecting said motive means to a point on said torsion rod spaced from said control member so as to impart sufficient twist to said rod to restore said signal generator to its null position against the couple exerted by said aneroid, whereby the amount of such twist is a measure of the pressure.

References Cited in the file of this patent

UNITED STATES PATENTS

| | | |
|---|---|---|
| 2,398,470 | Shivers | Apr. 15, 1946 |
| 2,415,429 | Kellog 2d et al. | Feb. 11, 1947 |
| 2,431,257 | Kellogg | Nov. 18, 1947 |
| 2,458,784 | Kettering et al. | Jan. 11, 1949 |
| 2,546,657 | Smoot | Mar. 27, 1951 |
| 2,599,288 | Schaefer | June 3, 1952 |
| 2,646,946 | Newton | July 28, 1953 |
| 2,677,091 | Douglas | Apr. 27, 1954 |
| 2,695,981 | Smoot | Nov. 30, 1954 |